United States Patent [19]

Tonus

[11] Patent Number: 4,480,765
[45] Date of Patent: Nov. 6, 1984

[54] NEEDLE SEEDER

[76] Inventor: Egidio L. Tonus, 10904 Oak St., Castroville, Calif. 95012

[21] Appl. No.: 449,351

[22] Filed: Dec. 13, 1982

[51] Int. Cl.³ .............................................. B65H 3/08
[52] U.S. Cl. .................................... 221/211; 221/254
[58] Field of Search ................ 221/211, 278, 254, 93; 111/1, DIG. 1, 77

[56] References Cited

U.S. PATENT DOCUMENTS

| 3,380,626 | 4/1968 | Giannini . | |
| 3,788,518 | 1/1974 | Beebe | 221/211 |
| 4,278,183 | 7/1981 | Billington | 221/211 |
| 4,375,854 | 3/1983 | Hedel | 221/254 X |

Primary Examiner—Stanley H. Tollberg
Attorney, Agent, or Firm—Townsend and Townsend

[57] ABSTRACT

A needle seeder for use in a seed delivery system is described. A seed needle is operated by a pneumatic cylinder or other such drive means in a reciprocating motion. During an upward stroke, the seed needle passes through a seed bed into a seed delivery port. The seed needle has a needle tip that includes a complementary recess for cradling a seed; a pressure differential maintained at the needle tip maintains the seed in position on the needle tip. At the furthest extent of an upward stroke, the seed needle tip is in place at a seed delivery port and the pressure differential at the needle tip is reversed, thereby expelling the seed from said tip and through a seed delivery hose. In one embodiment of the invention, a plurality of needle seeders are arranged in a row and mounted to a tractor driven seed delivery device for field seeding. In another embodiment of the invention, a series of rows of needle seeders form a seed delivery matrix whereby a greenhouse flat, having a plurality of individual containers, is planted in its entirety in one step. A further embodiment of the invention contemplates including a conveyor in the flat seeding embodiment of the invention, whereby greenhouse flats are planted in an assembly line fashion.

2 Claims, 7 Drawing Figures

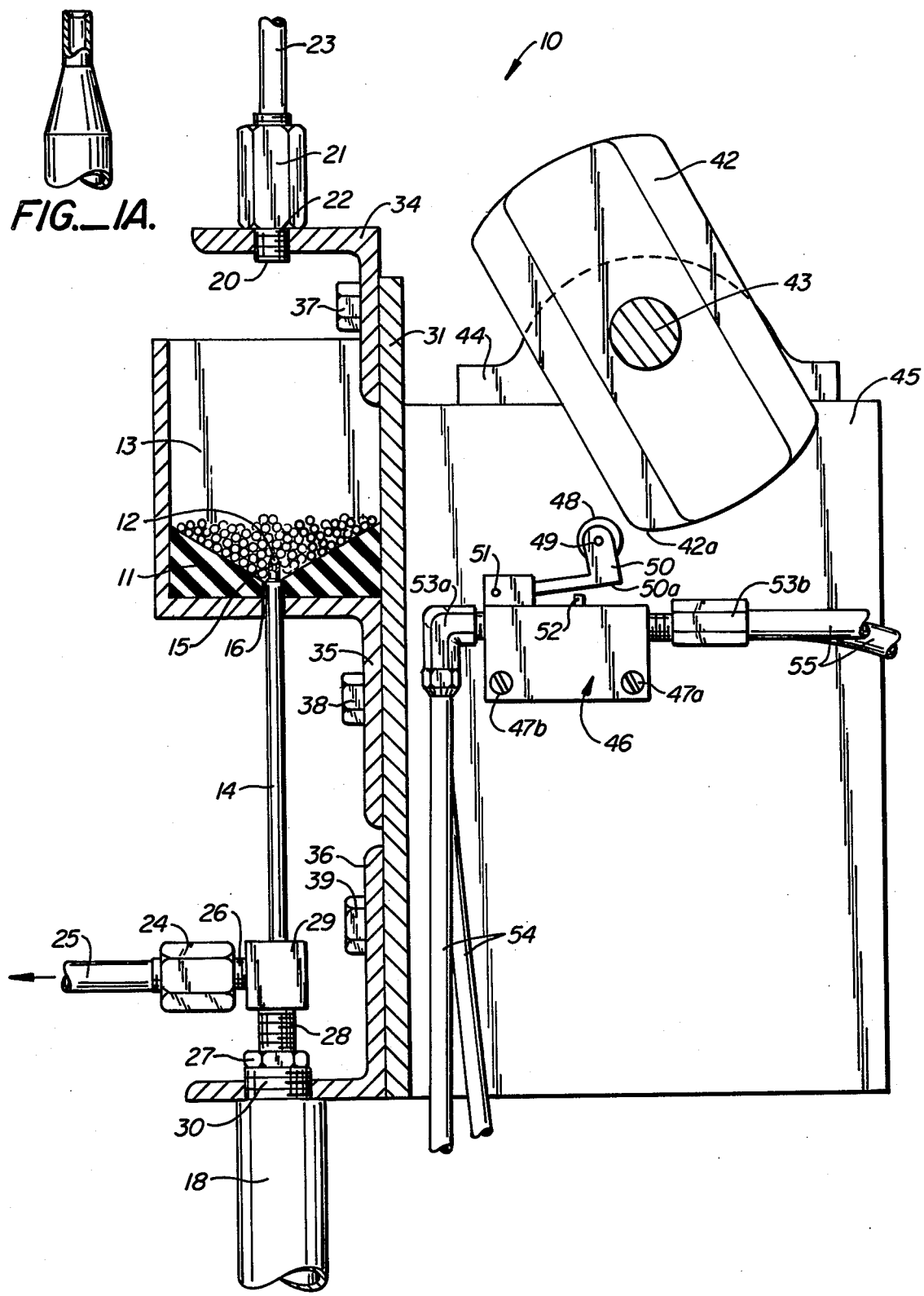
FIG._1A.
FIG._1.

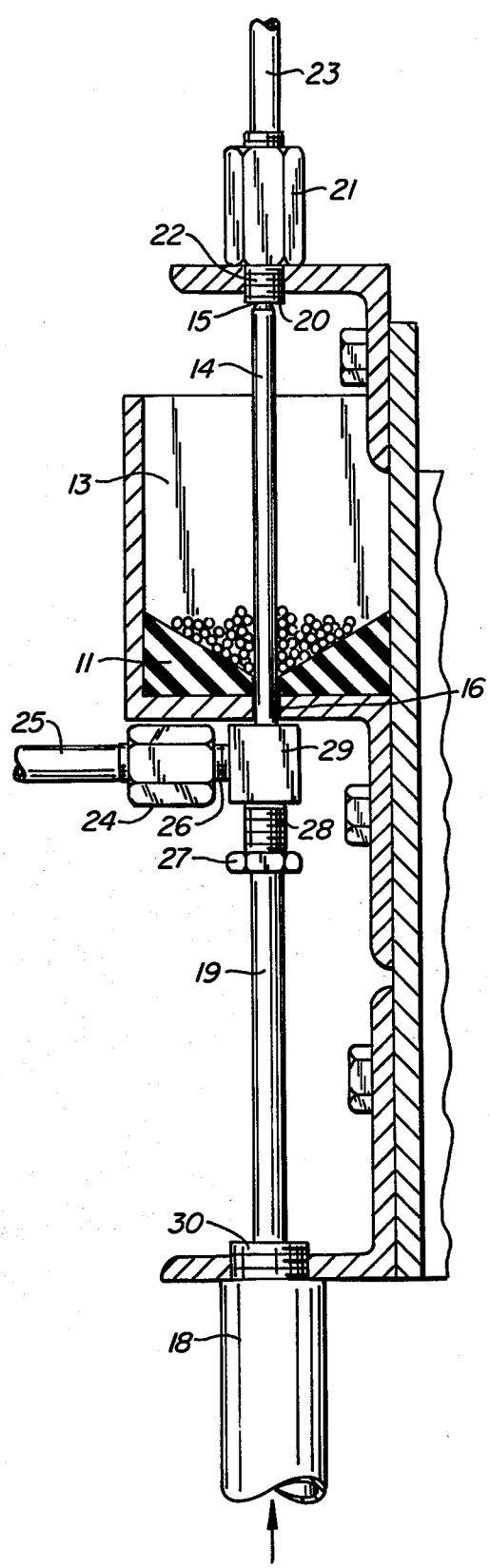
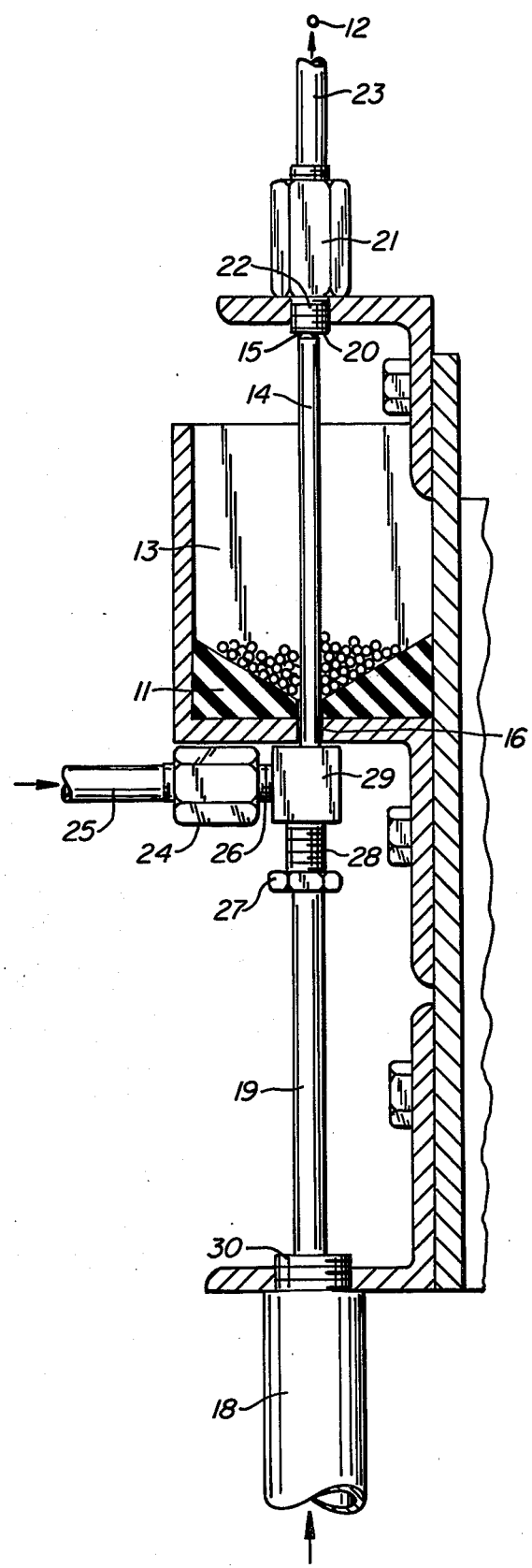
FIG.\_2.  FIG.\_3.

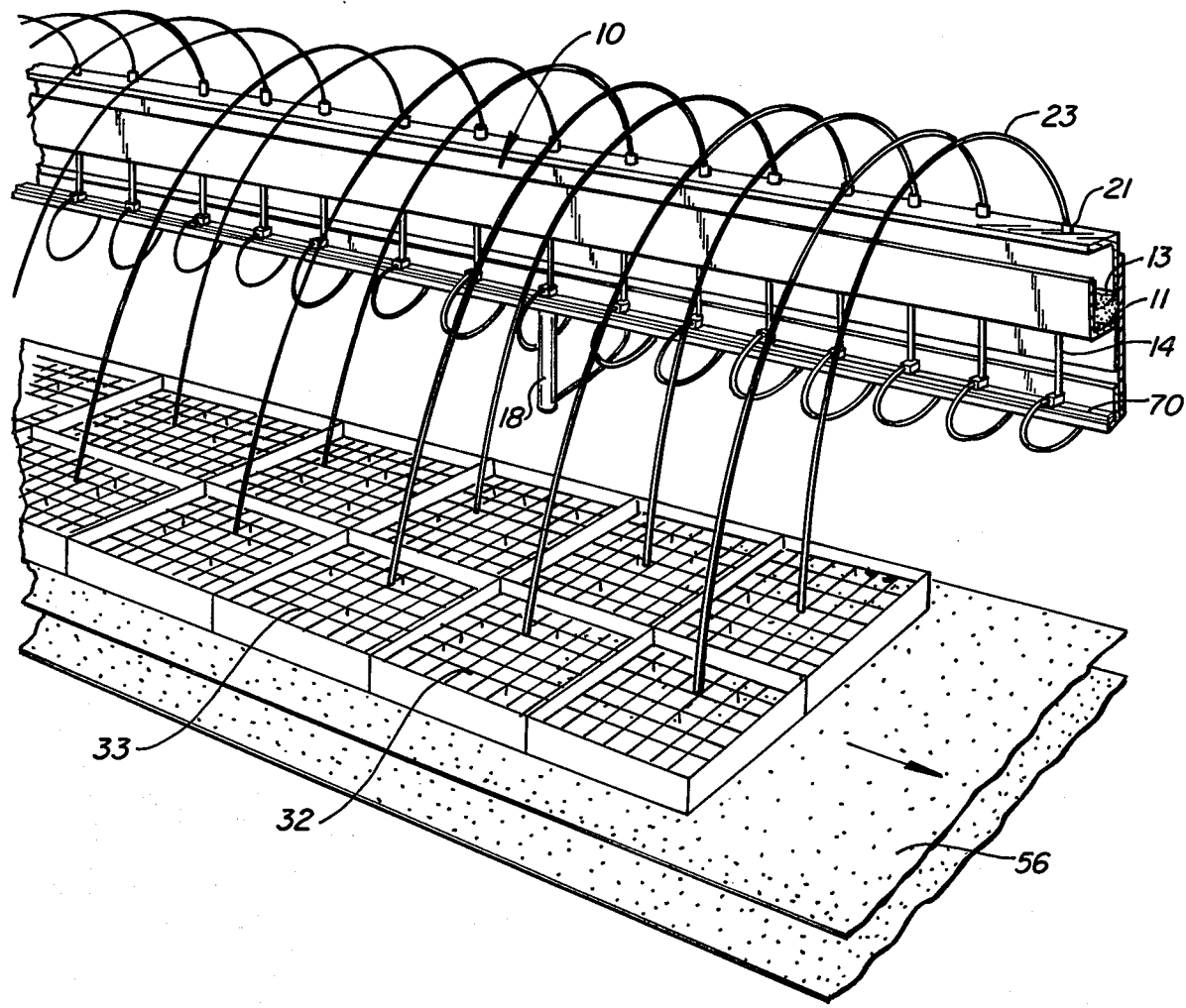
FIG._4.

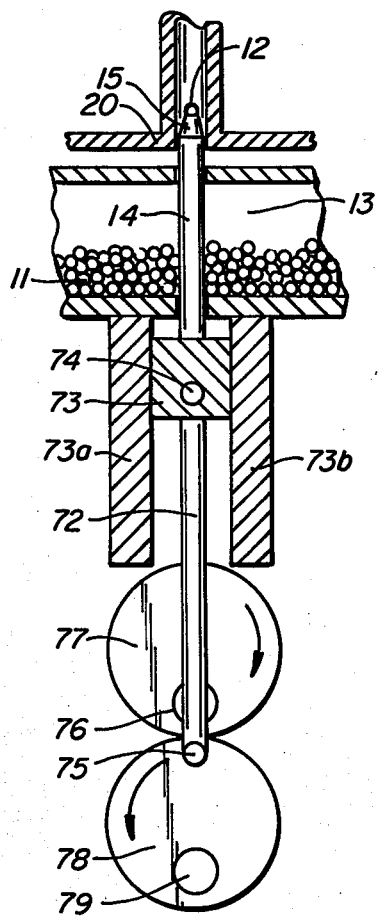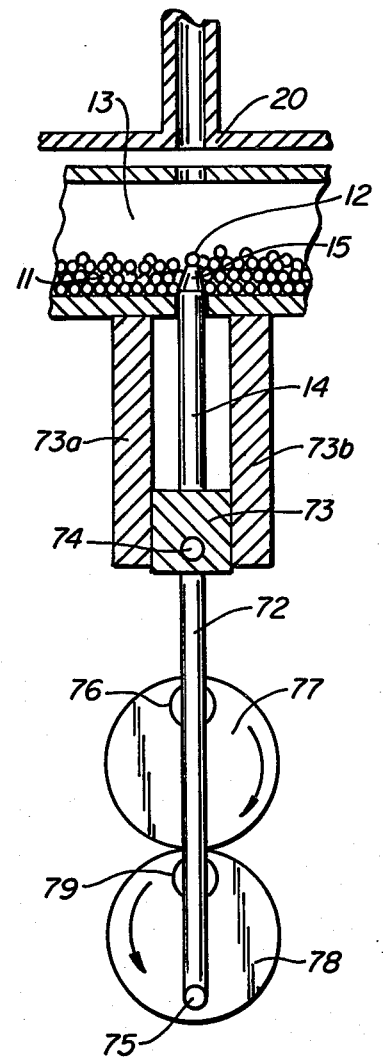
FIG._5A.
FIG._5B.

NEEDLE SEEDER

BACKGROUND OF THE INVENTION

1. Field of the Invention

The present invention relates to seeding devices. More particularly, the present invention provides a novel seeder of the type having a reciprocating seed pick-up needle and pressurized seed delivery.

2. Description of the Prior Art

Man's quest to provide himself and his family with food has long tested his inventive genius. Early agricultural techniques, involving broadcast sewing of seed and hand tilling of soil, have given way to mechanized seeding and tilling.

The field of mechanical seeding has been quite fertile for innovation. Early mechanical seeding techniques, such as the use of a seed drill, have ripened into many different known automatic, mechanical seeding devices. One such device is the "Single Seed Selector and Planter" of Giannini, U.S. Pat. No. 3,380,626, issued Apr. 30, 1968. Operation of such device, as best seen in FIG. 6 of the patent, uses a series of hollow, spoke-like projections radiating from a hub and rotated thereabout. The projections pass through a seed bed wherein a pressure differential allows them to lift a seed from the seed bed and carry it upwardly. A blast of air at a seed delivery location blows the seed from the projection and into a seed delivery system.

A similar rotary seed delivery system is the "Pneumatic Seed Dispenser" of Beebe, U.S. Pat. No. 3,788,518, issued Jan. 29, 1974. FIG. 2 of the patent shows a plurality of pipe-shaped projections, radiating from a central hub. The projections are rotated through a circuit in a manner similar to that shown in the Giannini patent. Beebe also includes a valve for removing the pressure differential on the projection at selected points along its rotary circuit, such that the seed is allowed to fall from the projection for delivery to a seed port.

Giannini and Beebe are typical of most modern automatic seeding devices. Such devices use a rotary pick-up device having a plurality of projections which radiate from a central hub and which are moved through a rotary circuit that includes a seed bed and a delivery port. Such devices are designed for delivering a serial flow of individual seeds, such as in the tractor drawn seeder shown in both patents.

Typical rotary seeders, are very complicated mechanically. Rotary motion of a seed pick-up projection through a seed bed and delivery circuit, while controlling a pick-up pressure differential, requires the coordinated interaction of many moving machine parts. The more complicated a machine, the more likely there will be mechanical failure of the machine. This is especially true when taking into account the brutal environment in which these machines are typically operated. The cogs, gears, wheels, and chains that operate rotary seeders are susceptible to damage due to accumulation of dirt and field debris. The result is that such machines require frequent maintenance.

An additional shortcoming of rotary seeders is that sweeping a projection through a seed bed does not produce a positive pick-up action for precision seed engagement with the projection. Oftentimes the projection will miss and not pick up a seed. Failure to pick up a seed reduces seed delivery and thereby reduces crop yield.

The sweeping motion of the rotary seeders also requires a large supply of seed in the seed bed—at least enough to totally surround the projection as it passes through the seed bed. As a result, a rather large seed hopper, containing excess seed (which is to say, wasted seed), must be included with such devices.

Rotary seeders are useful when seeding a field; in a greenhouse environment, they have significant drawbacks. For example, a rotary seeder may be ganged such that an entire row in a planter flat may be filled simultaneously. It is not practical—due to the mechanical complexity of such devices—to fill an entire flat at one time. There is no practical way to use a rotary seeder for precision seed delivery in a greenhouse setting.

Improvements in agricultural efficiency often come slowly. The rotary seeder produced an improvement in agricultural productivity. There are further gains to be made. Improving seeder reliability and simplicity, while increasing the precision with which seeds are delivered would be another significant step in improving agricultural productivity.

SUMMARY OF THE INVENTION

My invention is a seed pick-up device and precision seed singulation and delivery system for use in all agricultural applications, such as field plantings and greenhouses. My invention may be arranged in any number of configurations for any required seed delivery pattern, while maintaining a precise and controlled seed discharge. In this way, agricultural yields are improved and equipment downtime is eliminated. This is particularly important in a seasonal endeavor, such as planting a field, where equipment failure at a critical moment could mean a significant loss. Additionally, the precision seed singulation and delivery resulting from operation of my invention significantly reduces waste of expensive seed.

In its simplest form, my invention includes a reciprocating seed needle pick-up. The needle is hollow and includes a needle tip that has an indentation complementary to the shape of the seed to be delivered. In this way, one and only one seed is surely picked up during a seed delivery stroke and precise seed singulation is accomplished.

The needle is raised and lowered through a seed bed with a piston and cylinder arrangement that may be pneumatically or hydraulically operated. A mechanical arrangement may also be employed to accomplish needle reciprocation.

A pressure differential is maintained at the needle tip. During an upward stroke, the needle is forced through a seed bed. A negative pressure differential at the tip of the needle retains a seed thereto. The needle is forced past the seed bed to a seed delivery station. Once at the seed delivery station, the pressure differential at the needle tip is reversed and the seed expelled through a seed delivering tube. Cylinder operation and needle pressure are controlled by cam operated actuators but may also be controlled by other mechanical or electrical means.

One embodiment of my invention contemplates a row of such needle seeding devices for delivering seeds to plowed furrows in a tractor-drawn seed delivery system. Another embodiment of my invention contemplates a plurality of rows of such needle seeder devices for delivering seeds to plant a complete greenhouse flat in one operation on a conveyor or assembly line basis.

My invention provides a versatile, precision seeder wherein a serial flow of individual seeds may be delivered in any configuration required, at a rapid rate, and with near absolute certainty. In this way planting time is reduced, yields are improved, and seed waste is reduced. Additionally, the simplicity of my invention assures that maintenance need be minimal and that breakdowns at critical times will seldom, if ever, occur.

BRIEF DESCRIPTION OF THE DRAWINGS

FIG. 1 is a side view of my invention showing a seed trough, seed bed, and mounting in cross section;

FIG. 1A shows a form of needle tip.

FIG. 2 is a side view of my invention showing a needle piston extended from a needle cylinder;

FIG. 3 is a side view of my invention showing seed discharge;

FIG. 4 is a perspective view of my invention showing a plurality of needle seeders arranged for seed delivery to a greenhouse planter flat; and FIGS. 5A and B are side views of my invention showing a mechanical seed needle drive.

DETAILED DESCRIPTION OF A PREFERRED EMBODIMENT

My invention is a needle seeder for use in a seed singulation and delivery system. My invention finds application both in field seeding and in greenhouses. Reference is first had to FIG. 1 wherein an exemplary embodiment of my invention, a needle seeder 10, is shown in partial cross section.

A seed trough 13 is filled with and contains a seed bed 11. A hollow substantially vertical seed needle 14 projects along a needle axis through an aperture 16 formed through a bottom portion of trough 13. Seeder needle 14 includes a tip 15 having a inner recess complementary to the shape of an individual seed 12 which is to be picked up and delivered. Trough 13 is secured to a base 31 at a bracket portion 35 by a bolt 38.

Seed needle 14 is reciprocated upwardly and downwardly under the control of a cylinder 18, which includes a threaded neck portion 30 by which the cylinder is secured to a bracket 36. The bracket, in turn, is secured to base 31 by a bolt 39.

Because seed needle 14 is hollow, a pressure differential may be applied to needle tip 15. To this end a pneumatic hose 25 is connected to coupler 29 by means of a connector comprising a threaded post 26 with which a connector 24 may be engaged.

Seed is delivered through a seed delivery port 20 which includes a threaded fitting 22 engaged within an aperture through bracket 34. The bracket is secured to base 31 by a bolt 37. A connector 21 couples a seed delivery hose 23 to port 20.

In the exemplary embodiment of my invention, operation of cylinder 18 is accomplished by means of a pneumatic circuit. The pressure differential at needle tip 15 must be coordinated with the positioning of seed needle 14 in relation to seed bed 11 and delivery port 20. System control is effected by a cam secured to and rotated with a driven shaft 43. Shaft 43 is secured to a control base 45 by a bearing or bushing bracket 44. Any conventional means, such as an electric, pneumatic, or hydraulic motor may operate shaft 43, and thus drive cam 42. Shaft operation may be coordinated with operation of other system components, as discussed below.

Cam 42 operates an actuator 46. A cam edge 42a engages with an actuator roller 48. Roller 48 rotates about a shaft 49. As cam 42 continues to engage with roller 48, a lever 50 is caused to pivot about a spring loaded pivot axis 51. When the cam is fully engaged with the roller, a lever surface 50a presses an actuator plunger 52 and operates the actuator. Air inlet hoses 54 and outlet hoses 55 are coupled to actuator 46 by connectors 53a/53b. The actuator is secured to control base 45 by fasteners 47a/47b.

Still referring to FIG. 1, operation of a first embodiment of my invention is described as follows. Seed needle 14 is in its downward position as set by the position of a retaining collar 27 on a threaded shaft 28. The bottom portion of seed trough 13 is typically sloped. If only a few seeds are remaining trough 13 they are directed by the slope to seed needle tip 15 for engagement therewith. Some embodiments of my invention may also incorporate a seed trough vibrator (not shown) to further encourage seed migration toward the needle tip.

A negative pressure is placed on needle tip 15 to retain a seed within the tip. The negative pressure is indicated by an arrow at hose 25 and may be accomplished by means of a pump or any other such means. In some embodiments of my invention the negative pressure may be dispensed with. Typically, negative pressure (vacuum) is included only for applications where excessive vibration may dislodge a seed from the needle tip, as in field planting. Stationary installations of my invention do not require negative pressure, as in greenhouse planting.

Referring now to FIG. 2, a pressure is applied to cylinder 18, as indicated by the arrow. Piston 19 is forced from the cylinder along a cylinder axis and seed needle 14 accordingly rises through seed bed 11 to seed delivery port 20.

While needle tip 15 is maintained at seed delivery port 20, the pressure differential through needle 14 is reversed, such that a positive pressure is now exerted through the needle as indicated by the arrow at hose 25 (FIG. 3). This positive pressure forces a seed 12 from needle tip 15 through seed delivery hose 23, as indicated by the arrow at hose 23.

Referring now to FIG. 4, a needle seeder assembly 10 is shown wherein a single cylinder 18 operates a plurality of corresponding seed needles 14 (shown arranged in a row) by means of a bar 70. By this arrangement, one actuator operates an entire seed delivery mechanism, such that synchronization between cooperating elements is not a necessary consideration. It is important to note that although a piston and cylinder arrangement has been described as a source of reciprocating motion for the seed needles, an electrical solenoid or mechanical drive (FIG. 5) could also be used. In practice, the mechanical drive of FIG. 5 provides certain advantages, i.e. its rate of operation is more readily controlled, as discussed below.

A seed trough 13 is shown in cross section containing a seed bed 11. It can be seen from FIG. 4 that one seed trough may be used to accommodate as many needle seeders as are desired for a particular application. Additionally, although a single row is shown in FIG. 4, my invention may be made with a plurality of such rows which operate in unison, as is required for a particular application.

In FIG. 4, a plurality of seed delivery hoses 23 are coupled to the needle seeders by a connector 21. The hoses are arranged to deliver seeds to a flat 32, which is a matrix consisting of rows and columns of individual planters 33. Such flats are commonly used in greenhouses wherein each individual seed container receives a seed which, in turn, grows into an individual plant. Nurseries market such flats for both consumers and commercial gardeners.

The arrangement shown in FIG. 4 may also be secured to a tractor driven seed delivery system for use in field seeding. In such applications the delivery hoses provide a flow of individual seeds to such commonly available seed delivery systems as augers or seed drills.

Another embodiment of my invention arranges several rows of needle seeders to operate in conjunction with a conveyor. To this end, a conveyor 56 moves a plurality of flats 32 as indicated by the arrow in FIG. 4. As a flat is brought into position under the needle seeder, each container portion of the flat is filled with a seed. The entire flat is then conveyed away from the seeder and a new flat is brought into position beneath the seeder. In this way, an entire flat is planted in one operation. The present invention has been operated at rates up to 100 cycles/minute.

Referring now to FIG. 5 an alternate embodiment of my invention provides a reciprocating mechanical drive for moving the seed needle from the seed bed to the seed delivery port. FIG. 5a shows an upward stroke wherein seed needle 14 is extended upwardly such that seed needle tip 15 is engaged within seed delivery port 20. The seed needle is mounted to a base 73. An arm 72 is also mounted to base 73 for pivotal movement therewith at pivot point 74. A first wheel 77 includes a drive shaft 76 engaged for moving wheel 77. The end portion of arm 72 is affixed to wheel 78 at pivot point 75; wheel 78 is rotated about a shaft 79 by the combined action of wheels 77 and 78.

Still referring to FIG. 5a, operation of the mechanical reciprocating mechanism is now described. Drive wheel 77 is pivoted about shaft 76 as indicated by the arrow on the wheel. In turn, drive wheel 77 is engaged with wheel 78 by a means such as spur gears thus powering wheel 78 about the shaft 79 as shown by the arrow on the wheel. The motion of wheel 78 causes pivot point 75 to be rotated about shaft 79 thus causing arm 72 to pull base 73 downwardly. Base 73 is held in a vertical position by guides 73a and 73b. Thus the combined motion of wheel 78 and arm 72 convert rotary motion to reciprocal motion. Shaft 76 of drive wheel 77 and shaft 79 of driven wheel 78 are offset equally the same distance from the center of both wheels as shown in FIG. 5. Thus drive wheel 77 causes driven wheel 78 to have a given low speed and a given high speed for each revolution (the same action as is caused by eliptical gears). Therefore, when pivot point 75 and arm 72 are actuated in this manner, base 73 not only has reciprocal motion but also different velocities during this motion. Thus when needle 14 passes through a seed bed 11 (FIG. 5B), it does so slowly and gently assuring near perfect seed pickup and minimizing seed damage. Acceleration takes place during the upward stroke of needle 14 and reaches maximum velocity at the delivery port 20. This quick action helps deliver a seed 12 into delivery port 20. Deceleration occurs during the downward stroke of needle 14 and upon entering the seed bed 11 (FIG. 5B) the action of needle 14 begins anew.

The present invention provides a completely reliable, precision seed delivery system. Although operation of the invention has been described including a negative pressure differential during a seed pick-up stage, it has been found that this expedient is generally only necessary in an field planter embodiment of the invention. Thus, the negative pressure is included to counter vibration encountered in the field. This aspect of the invention could be eliminated in a greenhouse or assembly line type embodiment of the invention. It should also be noted that needle tip 15 may be formed with any sort of recess complementary to the seed being used. Thus, a plurality of tips may be provided for various plantings. In this way, the present invention provides complete versatility, in addition to precision and reliability. Furthermore, it will be appreciated that the elegance in simplicity of the present invention makes manufacture and maintenance a simple matter while significantly reducing the likelihood of failure.

As noted above, operation of the cylinder and needle pressure differential is coordinated by a cam and actuator arrangement. It has been further noted that a needle seeder may be operated in conjunction with a conveyor. That is, the conveyor may advance a flat into position beneath the needle seeder, at which time the seeds are delivered to the flat, and after which, the flat is further advanced. The sequence is then repeated. In some embodiments of my invention the cylinder may be replaced with an electric solenoid or other such electrically operated device. For example, a mechanical needle drive has been described. Control of such devices may be undertaken with an electronic computer or other electronic control means. Additionally, a pneumatic or hydraulic version of the invention could be electronically controlled.

The foregoing was given to illustrate and explain an exemplary embodiment of the present invention. It will be appreciated that the present invention is subject to modification and may be produced in various embodiments without departing from the scope and spirit of the invention. For example, in addition to those modifications and various embodiments cited above, the present invention could incorporate an auger type or other such seed delivery system for single seed delivery in a serial manner, reciprocating seed needle motion could be accomplished by an electric motor and associated drive, etc. Therefore, the scope of the invention should be limited only by the breadth of the claims.

I claim:

1. A seed delivery system, comprising:
   trough means for containing a seed bed;
   a plurality of spaced, hollow, substantially vertical seed needles, provided as a matrix of seed needles, arranged in rows and columns, each seed needle having a tip portion and projecting upwardly, along a needle axis through an opening in a bottom portion of said trough means and into said seed bed, the tip portion of each said needle including an inner recess;
   a seed delivery port associated with each seed needle;
   means for maintaining a negative pressure on each needle tip when said tip is at said seed bed and when said tip is moved between said seed bed and its associated seed delivery port, and for maintaining a positive pressure on each needle tip when said tip at its associated seed delivery port;
   means effecting coordinated reciprocal needle movement along said needle axes between said seed bed wherein an individual seed is picked up and cradled in each seed tip recess, and said associated seed port; and means, associated with each needle, for discharging said seed from said needle tip recess when at said associated delivery port.

2. The system of claim 1, said needle matrix further comprising:
means for conducting said discharged seed to a seed delivery station according to a selected seed delivery pattern.

* * * * *